United States Patent Office 3,239,370
Patented Mar. 8, 1966

3,239,370
HOT-MELT EXTRUSION COATING OF RANDOM COPOLYMER OF ETHYLENE AND MONO-CARBOXYLIC ACID
John E. Thomson and John V. Landry, Jr., Lake Jackson, and Marion W. Zembal, Freeport, Tex., assignors to The Dow Chemical Company, Midland, Mich., a corporation of Delaware
No Drawing. Filed May 14, 1962, Ser. No. 194,665
11 Claims. (Cl. 117—138.8)

This invention relates to the coating art. More particularly, this invention is concerned with a new process for coating substrates.

The coating of substrates with polyethylene has long been known to be desirable and is practiced on a large scale. Frequently, the coating is performed by the so-called hot-melt extrusion process. This type of process involves melting the polyethylene, extruding the molten polyethylene through a slit-die to form a molten film of the polyethylene and depositing the molten film onto the substrate it is desired to coat. This process has numerous shortcomings including a low degree of adhesiveness between the polyethylene and the substrate. For the vast majority of applications, good adhesion of the polyethylene to the substrate is regarded as essential. It has been reported that improved adhesion can be obtained by operating the process at very high temperatures. This, however, has not produced the desired degree of adhesive strength, and in addition, has introduced other problems into the process. Among these are that the molten film "necks-in" at the edges forming a bead on each edge which must subsequently be trimmed off causing wastage of both coating and substrate. This "necking-in," so-called, is a reduction in the width of the film between the extruder die and the point of deposition of the film on the substrate. Another difficulty with prior art processes is that they cannot be run as rapidly as is desired and still obtain a satisfactory product.

It is, therefore, a principal object of the present invention to provide a novel coating process. A further object of the present invention is the provision of a process for coating non-metallic substrates with certain ethylene polymers. Another object of the present invention is the provision of a process for coating non-metallic substrates with certain ethylene polymers whereby good adhesion is obtained between the ethylene polymers and the substrate. Still another object of the present invention is to provide processes of the aforementioned types which can be run rapidly and at relatively lower temperatures. A still further object of the present invention is the provision of a hot-melt extrusion coating process employing certain ethylene polymers, in which process there is relatively little neck-in of the molten polymer film.

These and other objects and advantages are obtained in accordance with the practice of the present invention which involves the hot-melt extrusion of random copolymers of ethylene and an acrylic acid in which the copolymers contain in polymerized form from about 2 percent by weight to about 12 percent by weight of an acrylic acid and preferably about 4 percent of an acrylic acid by weight. The melt is extruded into the form of a thin film and the film is deposited upon the substrate, such as a film, foil or sheet, it is desired to have coated. The substrate can be such non-metallic materials as wood, paper, paperboard, corrugated paper, leather, fabric, cellophane, glass, glassine plastic and the like.

By the term "an acrylic acid" as used throughout this specification is meant an $\alpha,\beta$-monoethylenically unsaturated monocarboxylic acid having from 3 to 7 carbon atoms. Representative specific examples of such acids are acrylic acid, methacrylic acid, ethacrylic acid, crotonic acid, isocrotonic acid, tilgic acid, angelic acid and senecioic acid. Among these, acrylic acid itself ($CH_2$=CH—COOH) is preferred.

The copolymers employed in the process of this invention are random copolymers and can be prepared by known methods, for example, by subjecting a mixture of ethylene and an acrylic acid to high pressures and elevated temperatures in the presence of a suitable catalyst.

Throughout this specification, parts and percentages are parts and percentages by weight unless otherwise indicated. The invention is illustrated more particularly by way of the following examples but, as will be apparent, is not limited to the details thereof.

EXAMPLE 1

A random copolymer containing in polymerized form 96 percent by weight of ethylene and 4 percent by weight of acrylic acid, as determined by infrared analysis, is prepared in a stirred autoclave reactor. Ethylene is fed into the reactor at the rate of 800 pounds per hour and acrylic acid is fed to the reactor at the rate of 2.1 pounds per hour. The monomers are reacted in the presence of a peroxy catalyst at a pressure of 16,000 pounds per square inch and at a temperature of 210° C. The copolymer is recovered by separation from unreacted monomer and is found to have a density of 0.926 gram per cubic centimeter and a melt index of 5.

The copolymer is fed through a 40 inch extruder having a diameter of 2½ inches and then through a 28 inch extrusion die to form a molten film. The copolymer is extruded at a temperature of 575° F. and the molten film is deposited on a 40 pound bleached kraft paper base. The extruded film has a neck-in of only one inch. The polyethylene exhibits very good adhesion to the kraft paper.

By way of contrast, a commercial grade of polyethylene having a density of 0.917 gram per cubic centimeter and a melt index of 5 is substituted for the ethylene/acrylic acid copolymer in the process of Example 1. The minimum temperature at which this polyethylene can successfully be extruded is 625° F. The film made by extruding this polyethylene has a neck-in of 1⅝ inches.

EXAMPLE 2

An ethylene/acrylic acid copolymer having the same density and melt index as the copolymer employed in Example 1 but containing 97 percent by weight of ethylene and 3 percent by weight of acrylic acid is coated in the manner of Example 1 on 40 pound kraft paper. The polyethylene referred to following Example 1 is used here also as a control. Coatings 0.4 mil thick are made on the paper. The process of this invention using the ethylene/acrylic acid copolymer produces a coated paper having an adhesion rating of 93 (out of a possible 100) whereas a polyethylene coating of the same thickness has an adhesion rating of only 86. In this example, as in the preceding and following examples, it is necessary to employ an extrusion temperature of 625° F. for the polyethylene whereas the ethylene/acrylic acid copolymer is extruded at 575° F. Further, the copolymer in the process of this example and Example 3, which follows, has a neck-in of only one inch.

EXAMPLE 3

The process of Example 2 is repeated in all its essentials except that the coating thicknesses are regulated to 0.3 mil. The ethylene/acrylic acid copolymer has an adhesion rating of 72 whereas the polyethyelne has an adhesion rating of 68.

EXAMPLES 4 THROUGH 15

In each of these examples, the process of this invention is carried out using a copolymer of 97.4 percent by weight ethylene and 2.6 percent by weight acrylic acid having a density of 0.9238 g./cc. and a Melt Index of 8.7. The polyethylene described following Example 1 is used here in the control runs $C_1$, $C_2$, $C_3$ and $C_4$. The data for these examples are set out in Table I along with the control runs.

*Table I*

| Example | Extrusion Temperature (° F.) | Haul Off Rate (ft./min.) | Coating Thickness (mil) | Adhesion [1] (lbs./in.²) |
|---|---|---|---|---|
| 4 | 550 | 180 | 0.4 | 9 |
| 5 | 550 | 220 | 0.4 | 5 |
| 6 | 550 | 260 | 0.2 | 3 |
| 7 | 550 | 300 | 0.2 | 3 |
| 8 | 600 | 180 | 0.5 | 28 |
| 9 | 600 | 220 | 0.4 | 18 |
| 10 | 600 | 260 | 0.3 | 11 |
| 11 | 600 | 300 | 0.3 | 9 |
| 12 | 640 | 180 | 0.4 | 29 |
| 13 | 640 | 220 | 0.4 | 27 |
| 14 | 640 | 260 | 0.3 | 15 |
| 15 | 640 | 300 | 0.3 | 11 |
| $C_1$ | 600 | 180 | 0.4 | 9 |
| $C_2$ | 600 | 220 | 0.3 | 6 |
| $C_3$ | 600 | 260 | 0.3 | 4 |
| $C_4$ | 600 | 300 | 0.2 | 3 |

[1] Perkins-Southwick adhesion test.

EXAMPLES 16 THROUGH 25

In these examples, the copolymer applied in Example 4 is applied to various substrates identified in Table II below along with the extrusion temperatures employed, the thicknesses of the coatings applied and the peel strength of the coating. The coatings are applied to 8 inch by 12 inch sheets by passing them through the apparatus at the rate of 90 feet per minute. The peel strengths are determined on an Instron tester operated at a speed of 10 inches per minute on specimens one inch wide. The control runs ($C_5$ etc.) employ a standard homopolyethylene having a density of 0.917 g./cc. and a melt index of 5.

*Table II*

| Example | Substrate | Extrusion Temperature (° F) | Coating Thickness (mils) | Peel Strength (grams) |
|---|---|---|---|---|
| 16 | Mylar [1] | 550 | 1.1 | 8 |
| 17 | do | 575 | 1.1 | 20 |
| $C_5$ | do | 550 | 1.3 | 4 |
| $C_6$ | do | 575 | 1.1 | 9 |
| 18 | Cellophane [2] | 550 | 1.2 | 15 |
| 19 | do | 575 | 1.1 | 85 |
| 20 | do | 600 | | 325 |
| 21 | do | 625 | | CNS |
| $C_7$ | do | 550 | 1.3 | 2 |
| $C_8$ | do | 575 | 1.0 | 5 |
| $C_9$ | do | 600 | | 275 |
| $C_{10}$ | do | 625 | | 350 |
| 22 | Saran coated cellophane [3] | 550 | 1.0 | 20 |
| 23 | do | 575 | 1.2 | 45 |
| 24 | do | 600 | | 70 |
| 25 | do | 625 | 1.2 | 275 |
| $C_{11}$ | do | 550 | 1.2 | 6 |
| $C_{12}$ | do | 575 | 1.3 | 25 |
| $C_{13}$ | do | 600 | | 55 |
| $C_{14}$ | do | 625 | 1.6 | 200 |

[1] DuPont poly(ethyleneterephthalate).
[2] Ethylene/acrylic acid copolymer applied to uncoated side.
[3] Ethylene/acrylic acid copolymer applied to side already having a saran coating 2 mils thick.
CNS: Abbreviation for "could not be separated."

In addition to the foregoing advantages of the instant process, it is found that ink adheres well to coatings of the copolymers employed in the process of this invention. No special treatment is necessary to print on the coated substrate products of this process with flexographic ink. The resin used in the process of this invention has been found to possess a low gel count, has excellent color and exhibits excellent extrusion characteristics. As an illustration of the last attribute, it is found that the copolymer of Example 4 above can be drawn down at speeds in excess of 530 feet per minute and that at that speed, the neck-in is only 1.2 inches.

In the hot-melt extrusion process of this invention, there can be included in the melt, minor amounts of materials such as dyes, pigments, stabilizers, lubricants, resins other than the ethylene/acrylic acid copolymer, fillers and so forth. As indicated above, a wide variety of substrates can be coated according to the instant invention including veneers, screens and textiles.

That which is claimed is:

1. An article of manufacture comprising a non-metallic substrate having a coating thereon of a random copolymer of ethylene and an $\alpha,\beta$-monoethylenically unsaturated monocarboxylic acid having from 3 to 7 carbon atoms, said copolymer containing from about 2 percent by weight to about 12 percent by weight of said acid.

2. An article of manufacture comprising a non-metallic substrate having a coating thereon of a random copolymer of ethylene and acrylic acid, said copolymer containing from about 2 percent by weight to about 12 percent by weight of said acrylic acid.

3. An article of manufacture according to claim 2 in which said non-metallic substrate is paper.

4. An article of manufacture according to claim 3 in which said paper substrate is kraft paper.

5. An article of manufacture according to claim 2 in which said substrate is cellophane.

6. An article of manufacture according to claim 2 in which said substrate is a plastic.

7. An article of manufacture according to claim 6 in which said plastic substrate is saran.

8. An article of manufacture according to claim 6 in which said plastic substrate is poly(ethyleneterephthalate).

9. An article of manufacture comprising a non-metallic substrate having a coating thereon of a random copolymer of ethylene and acrylic acid, said copolymer containing about 4 percent by weight of acrylic acid.

10. An article of manufacture according to claim 9 in which said non-metallic substrate is paper.

11. An article of manufacture according to claim 10 in which said paper substrate is kraft paper.

References Cited by the Examiner
UNITED STATES PATENTS

| | | | |
|---|---|---|---|
| 2,566,244 | 8/1951 | Pinkney | 117—155 |
| 2,714,571 | 8/1955 | Irion et al. | 117—155 |
| 2,894,853 | 7/1959 | Anderson | 117—155 |
| 2,970,129 | 1/1961 | Rugg et al. | 117—155 |
| 3,072,483 | 1/1963 | Trevoy et al. | 117—161 |
| 3,132,120 | 5/1964 | Graham et al. | 260—88.1 |

JOSEPH B. SPENCER, *Primary Examiner.*

JOSEPH REBOLD, WILLIAM D. MARTIN, *Examiners.*

UNITED STATES PATENT AND TRADEMARK OFFICE
Certificate

Patent No. 3,239,370                                                  Patented March 8, 1966

John E. Thomson, John V. Landry and Marion W. Zembal

Application having been made by John E. Thomson, John V. Landry and Marion W. Zembal, the inventors named in the patent above identified, and The Dow Chemical Company, Midland, Michigan, a corp. of Delaware, the assignee, for the issuance of a certificate under the provisions of Title 35, Section 256, of the United States Code, deleting the names of John V. Landry and Marion W. Zembal as joint inventors, and a showing and proof of facts satisfying the requirements of the said section having been submitted, it is this 1st day of July 1975, certified that the names of the said John V. Landry and Marion W. Zembal are hereby deleted to the said patent as joint inventors with the said John E. Thomson.

FRED W. SHERLING,
*Associate Solicitor.*